(12) United States Patent
Takemura et al.

(10) Patent No.: US 6,626,135 B2
(45) Date of Patent: Sep. 30, 2003

(54) VALVE DRIVE APPARATUS FOR INTERNAL COMBUSTION ENGINE

(75) Inventors: Shinichi Takemura, Yokohama (JP); Shunichi Aoyama, Kanagawa (JP); Tsuneyasu Nohara, Kanagawa (JP); Takanobu Sugiyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/042,234

(22) Filed: Jan. 11, 2002

(65) Prior Publication Data
US 2002/0100443 A1 Aug. 1, 2002

(30) Foreign Application Priority Data

Jan. 31, 2001 (JP) .......................................... 2001-022855
Sep. 18, 2001 (JP) ........................................ 2001-282926

(51) Int. Cl.⁷ .................................................. F01L 1/34
(52) U.S. Cl. ................................ 123/90.17; 123/90.15; 123/90.16
(58) Field of Search ................. 123/90.6, 90.15–90.17, 123/90.22, 90.23, 90.27, 90.28, 90.31, 90.39, 90.41–90.45

(56) References Cited

U.S. PATENT DOCUMENTS

| | | | |
|---|---|---|---|
| 5,606,942 A | * | 3/1997 | Tsuzuku et al. ......... 123/90.16 |
| 5,937,809 A | | 8/1999 | Pierik et al. |
| 5,988,125 A | | 11/1999 | Hara et al. |
| 5,996,540 A | | 12/1999 | Hara |
| 6,029,618 A | | 2/2000 | Hara et al. |
| 6,041,746 A | | 3/2000 | Takemura et al. |
| 6,055,949 A | | 5/2000 | Nakamura et al. |
| 6,123,053 A | | 9/2000 | Hara et al. |
| 6,260,523 B1 | * | 7/2001 | Nakamura et al. ....... 123/90.15 |
| 2002/0062801 A1 | * | 5/2002 | Shimizu ................. 123/90.16 |

FOREIGN PATENT DOCUMENTS

JP    2000-64814    2/2000

* cited by examiner

Primary Examiner—Thomas Denion
Assistant Examiner—Kyle Riddle
(74) Attorney, Agent, or Firm—Foley & Lardner

(57) ABSTRACT

Intake valve drive shaft and exhaust valve drive shaft are arranged in parallel to each other and provided with sprockets, respectively, for receiving engine rotation from a crank shaft. A rocker cam is swingably mounted on the intake valve drive shaft to push the intake valve, and connected mechanically by a link mechanism with the intake valve drive shaft. The axis of the intake valve drive shaft is offset from the axis of the intake valve to one side. The rocker cam includes a cam nose which projects to the other side of the axis of the intake valve when the intake valve is in the closed state.

20 Claims, 11 Drawing Sheets

VALVE DRIVE APPARATUS FOR INTERNAL COMBUSTION ENGINE

This application is based on prior Japanese Patent Applications Nos. 2001-22855 (filed in Japan on Jan. 31, 2001), and 2001-282926 (filed in Japan on Sep. 18, 2001). The entire contents of these Japanese Patent Applications Nos. 2001-22855 and 2001-282926 are hereby incorporated by reference.

BACKGROUND OF THE INVENTION

The present invention relates to an internal combustion engine, and more specifically a valve drive mechanism including intake and exhaust valve drive shafts each provided with sprocket or pulley driven by an engine crank shaft through timing chain or timing belt.

A published Japanese Patent Application Publication (Kokai) No. 2000-64814 shows a direct drive type overhead cam, valve drive mechanism having camshafts (or valve drive shafts) extending in parallel to each other above a cylinder head.

SUMMARY OF THE INVENTION

It is an object of the present invention to provide a valve drive apparatus for an internal combustion engine capable of setting a valve included angle formed between intake and exhaust valve axes to a desired value without changing an inter-shaft distance between intake valve drive shaft and exhaust valve drive shaft.

According to the present invention, a valve drive apparatus for an internal combustion engine, comprises: a first valve drive shaft adapted to be driven by the engine; a rocker cam to push a first valve of the engine by swinging about a first shaft axis of the first valve drive shaft; and a link mechanism connecting mechanically the rocker cam and the first valve drive shaft to transmit motion from the first valve drive shaft to the rocker cam. The first shaft axis of the first valve drive shaft about which the rocker cam swings is offset from a valve axis of the first valve.

The other objects and features of this invention will become understood from the following description with reference to the accompanying drawings.

DETAILED DESCRIPTION OF THE INVENTION

Figure 1:
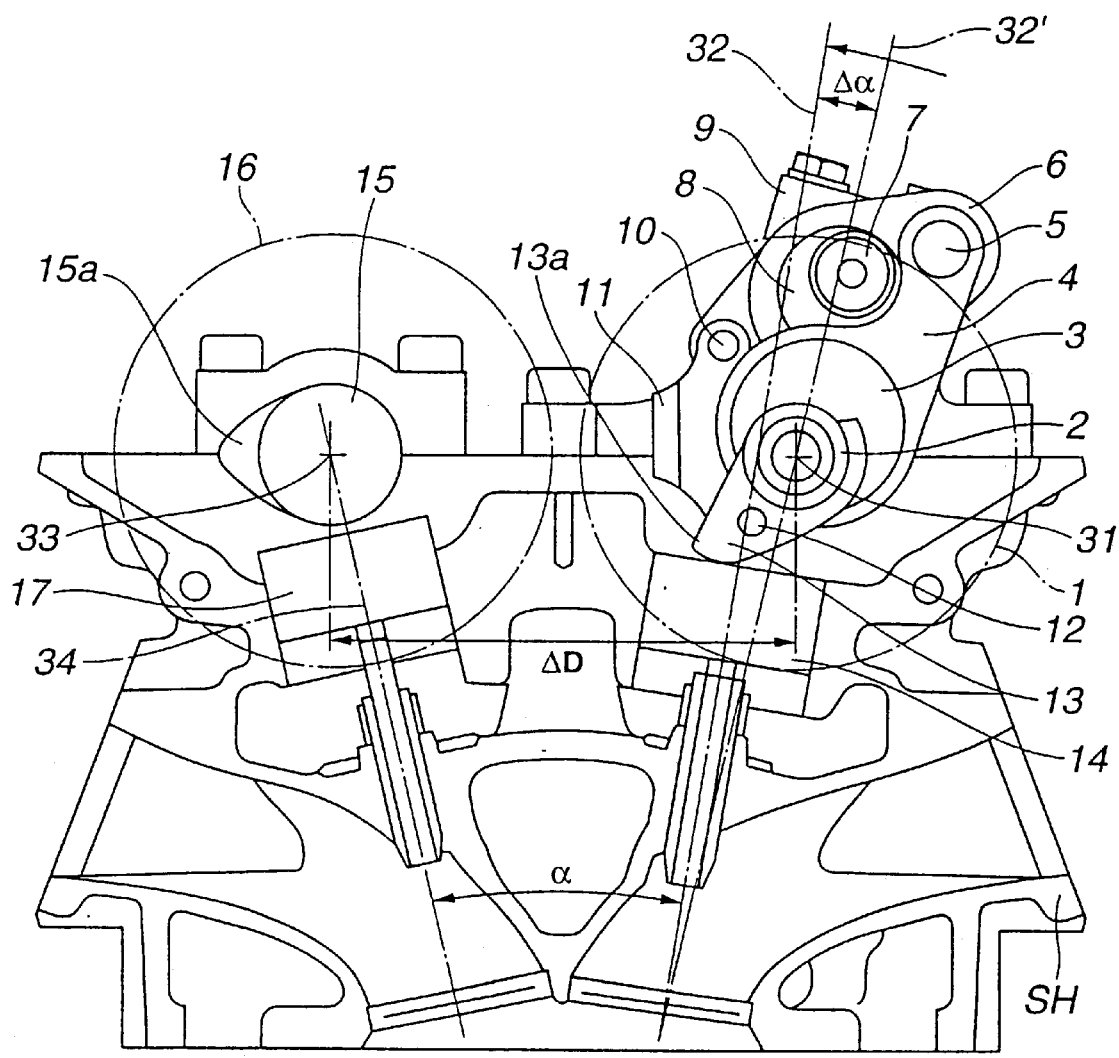
FIG. 1 is a front view showing a valve drive apparatus according to a first embodiment of the present invention.
Figure 2:
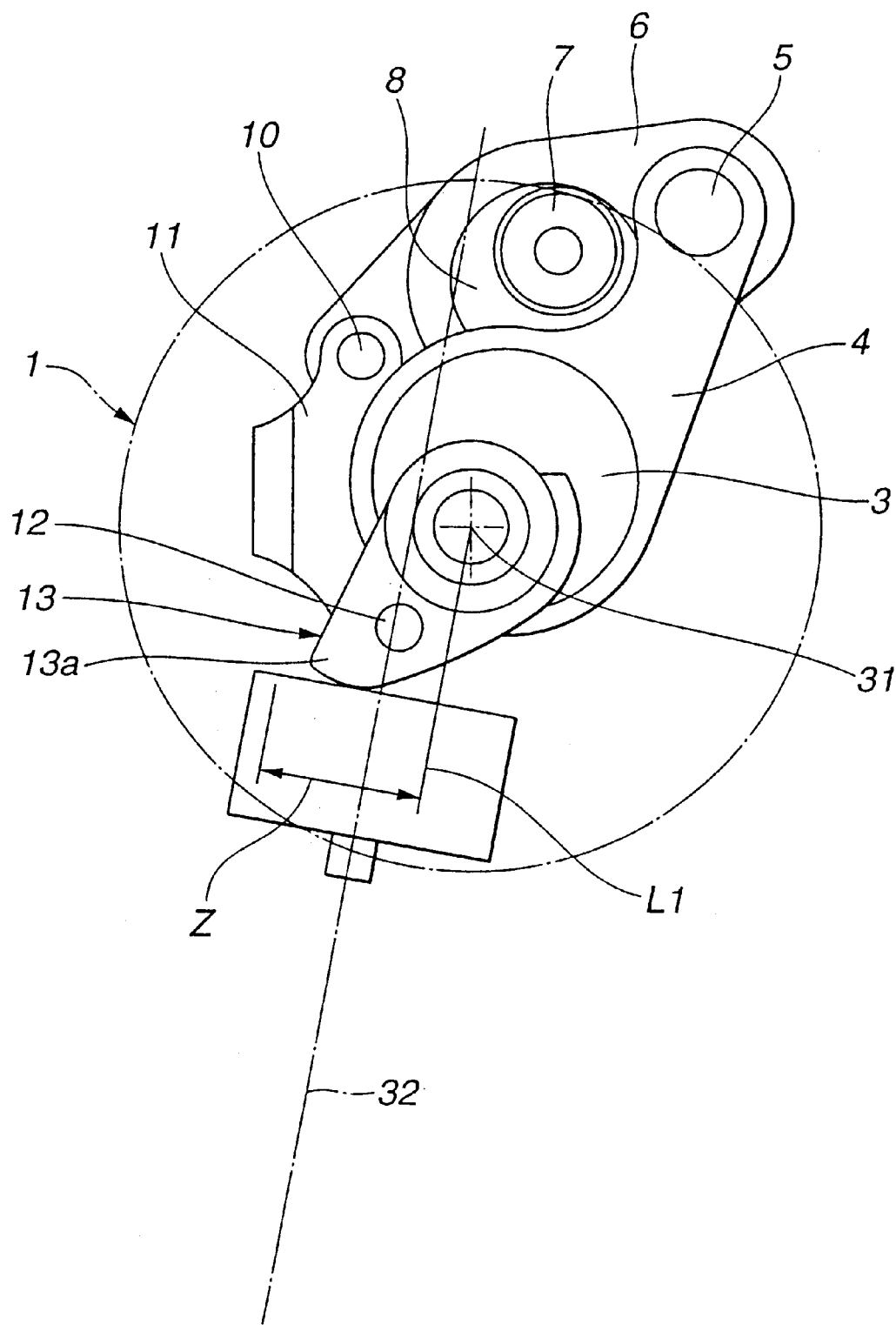
FIG. 2 is a front view showing a main portion of the valve drive apparatus of FIG. 1.

FIGS. 1 and 2 show an internal combustion engine equipped with a valve drive (or valve operating) apparatus or mechanism according to a first embodiment of the present invention.

Figure 4:
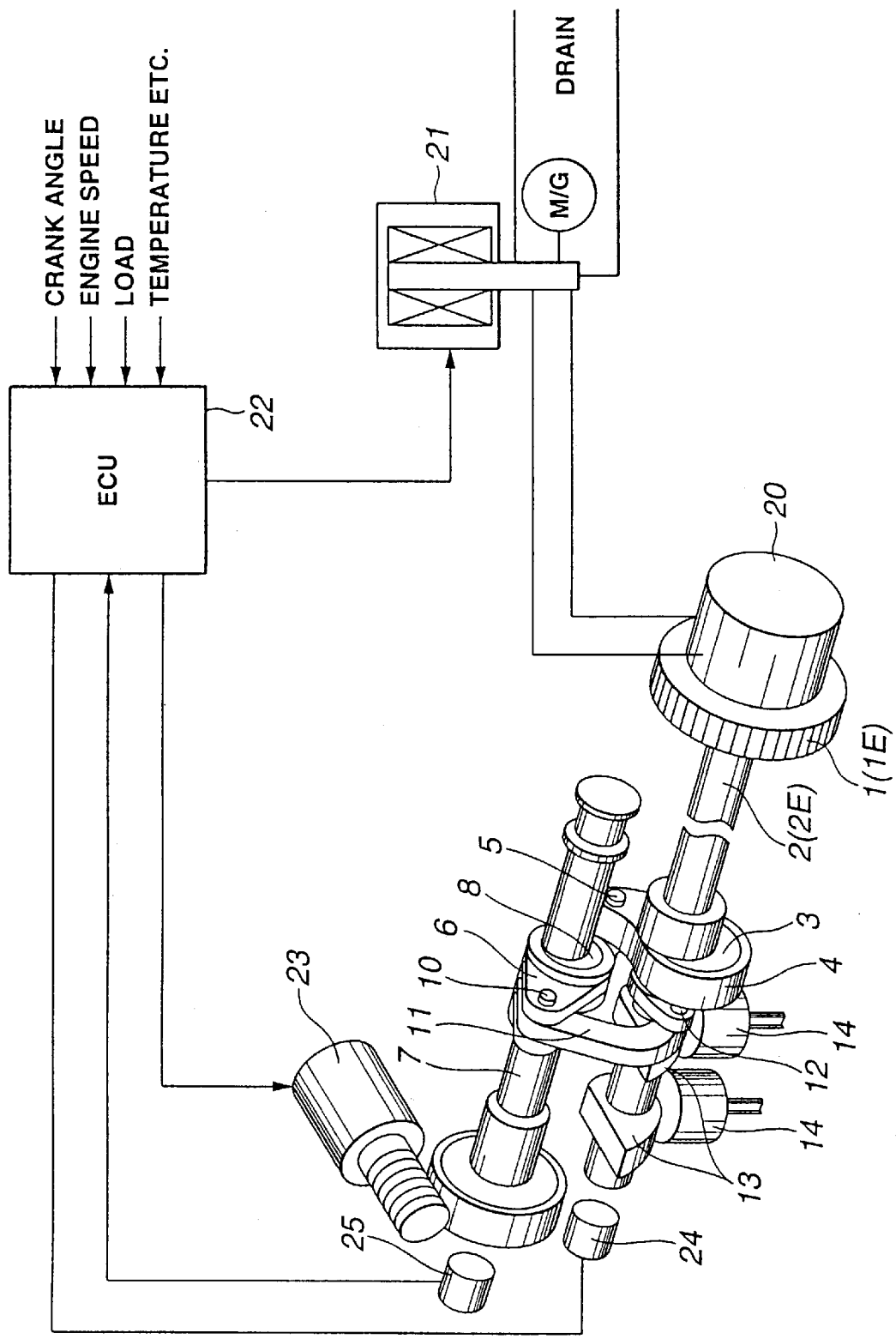
FIG. 4 is a perspective view showing a valve drive apparatus according to a third embodiment.

Above a cylinder head SH, an intake valve drive shaft 2 and an exhaust valve drive shaft 15 extend in parallel to each other in a direction of row of cylinders of the engine. Both shafts 2 and 15 are supported rotatably. An intake sprocket 1 is provided at one end of intake valve drive shaft 2. Intake sprocket 1 is coaxial with intake valve drive shaft 2. In this example, intake sprocket 1 is fixed to the end of intake valve drive shaft 2. Alternatively, intake sprocket 1 may be coaxially mounted on intake valve drive shaft 2 through a phase altering (or adjusting) device 20, as shown in FIG. 4. An exhaust sprocket 16 is fixedly mounted on one end of exhaust valve drive shaft 15.

Intake and exhaust sprockets 1 and 16 are identical in diameter and number of teeth, to each other. These two sprockets are disposed close to each other. Each sprocket 1 or 16 is connected with a crank sprocket (or crank shaft sprocket) of an engine crank shaft by a timing chain. Rotation of the crank shaft is transmitted to each valve drive shaft 2 or 15 by the timing chain. In the case of a four cycle engine, the reduction ratio of the chain drive between the crank sprocket and each of intake and exhaust sprockets 1 and 16 is set at ½, and the diameter of each of intake and exhaust sprockets 1 and 16 is about twice the diameter of the crank sprocket.

A rocker cam 13 for each cylinder is rotatably mounted on intake valve drive shaft 2, and arranged to abut on and push down a valve lifter of the corresponding intake valve. Each rocker cam 13 is connected mechanically with intake valve drive shaft 2 by a link mechanism (or linkage) which serves as an operating angle altering (or adjusting) mechanism. The link mechanism of this example is constructed in the following manner. An eccentric cam 3 for each cylinder is fixedly mounted on intake valve drive shaft 2 in an eccentric manner. A first link 4 shaped like a ring is fit over eccentric cam 3 in such a manner that first link 4 can rotate relative to eccentric cam 3. First link 4 includes a projecting portion whose end is connected through a pin 5 with a first end of a rocker arm 6.

A control shaft 7 extends in parallel to intake valve drive shaft 2 in the cylinder row direction of the engine. Control shaft 7 is located above intake valve drive shaft 2, off to one side. The center axis of control shaft 7 is located away from an imaginary vertical plane containing the center axis of intake valve drive shaft 2. In the example of FIG. 1, control shaft 7 is located on the right side of this imaginary vertical plane, that is on the outer side of this imaginary vertical plane extending in parallel to the axis of the cylinder. Control shaft 7 is rotatably supported through a bracket 9 by cylinder head SH so that control shaft 7 is rotatable relative to cylinder head SH. A control cam 8 for each cylinder is fixedly mounted on this control shaft 7 in an eccentric manner. A center portion of the rocker arm 6 is rotatably fit over each control cam 8, so that rocker arm 6 is rotatably mounted on control cam 8. Rocker arm 6 has a second end which is connected through a pin 10 with a first end of a rod-shaped second link 11. Second link 11 has a second end which is connected through a pin 12 with a projecting portion of rocker cam 13. Rocker cam 13 is rotatably mounted on intake valve drive shaft 2.

When intake valve drive shaft 2 is driven by the crank shaft, intake valve drive shaft 2 rotates, and eccentric cam 3 fixedly mounted on this rotating shaft 2 causes first link 4 to move up and down as viewed in FIG. 1, approximately in a manner of translational motion. This translational motion of first link 4 is then converted to swing motion of rocker arm 6, and second link 11 causes rocker cam 13 to swing about the center axis 31 of intake valve drive shaft 2. This rocker cam 13 abuts against and pushes down the intake valve lifter 14, and thereby opens the intake valve against the force of valve spring of the intake valve.

An actuator 23 (shown in FIG. 4) is constructed to rotate control shaft 7 in accordance with engine operating condition, and thereby to shift the center of control cam 8, relative to cylinder head SH. By thus shifting the center of control cam 8 about which rocker arm 6 swings, actuator 23 can change the attitudes of rocker arm 6 and links 4 and 11, and alter the swing characteristic of rocker cam 13. In this way, actuator 23 can continuously vary the operating angle and valve lift quantity of the intake valve.

In the thus-constructed operating angle altering mechanism, rocker cam 13 is mounted coaxially with intake valve drive shaft 2. This coaxial arrangement is advantageous in preventing misalignment or maladjustment of rocker cam 13 and intake valve drive shaft 2, and hence superior in control accuracy. Moreover, rocker arm 6 and links 4 and 11 are arranged closely around the intake valve drive shaft 2, to the advantage to the compactness of the operating angle altering mechanism. Most of members are in contact with one another over an area. This construction is advantageous in lubrication, durability and reliability. For example, the bearing interface portion between eccentric cam 3 and first link 4, and the bearing interface portion between control cam 8 and rocker arm 6 have substantial contact areas.

When this altering mechanism is applied to an ordinary direct drive type valve operating system having a fixed cam (such as item 15*a* on the exhaust side as shown in FIG. 1) and cam shaft (such as an exhaust valve drive shaft 15), the application is very easy because the fixed cam and cam shaft can be replaced by rocker cam and valve drive shaft with no or little change in the layout.

The exhaust side in the example shown in FIG. 1 has no such adjusting mechanism. A fixed cam 15*a* for each cylinder is fixedly mounted on (or formed integrally with) an exhaust valve drive shaft 15, so that fixed cam 15*a* rotates as a unit with exhaust valve drive shaft 15. Each of the fixed cams 15*a* abuts on and pushes down a corresponding exhaust valve lifter 17, and thereby operates the exhaust valve in the open and closed positions.

The center axis 33 of exhaust valve drive shaft 15 is located on a valve axis 34 (or an extension of valve axis 34) of the exhaust valve when viewed in the axial direction as shown in FIG. 1 in the first embodiment (and second, third and fourth embodiments). When fixed cam 15*a* has approximately identical profiles for cam ascending section (or interval) and cam descending section (or interval), an offset arrangement in which center axis 33 of exhaust valve drive shaft 15 is offset from exhaust valve axis 34 would shift a contact zone (or contact travel range) between fixed cam 15*a* and valve lifter 17 as a whole to a position offset with respect to exhaust valve axis 34. In such an offset arrangement, therefore, it is difficult to set a sufficient contact zone and to obtain a desired output performance because of limitations on the operating angle and valve lift quantity. Moreover, the moment applied from fixed cam 15*a* to the exhaust valve is increased undesirably. Therefore, the non-offset arrangement in which center axis 33 passing through a point lying on an extension of the valve axis 34 is desirable when the cam profile is approximately the same between the ascending section and descending section of fixed cam 15*a*.

On the intake valve's side provided with rocker cam 13, by contrast, center axis 31 of intake valve drive shaft 2 is offset from valve axis 32 of the intake valve to the outer side of cylinder head SH (to the right as viewed in FIGS. 1 and 2), so that intake valve axis 32 is located between exhaust valve axis 34 and the position of center axis 31. In other words, intake valve axis 32 is offset from center axis 31 of intake valve drive shaft 2 toward exhaust valve axis 34 (to the left in FIGS. 1 and 2) or toward an imaginary median (center) plane of cylinder head SH which lies between intake and exhaust valve axes 32 and 34.

Moreover, a cam nose 13*a* of rocker cam 13 extends to the inner side of cylinder head SH (toward the median plane) when the intake valve is closed. In other words, during the valve closing period of the intake valve, cam nose 13*a* of rocker cam 13 rotates toward the inner side of cylinder head SH (in the clockwise rotational direction as viewed in FIGS. 1 and 2).

The thus-constructed valve train according to this embodiment can decrease a valve included angle (or intervalve angle) a formed between exhaust valve axis 34 and intake valve axis 32, by $\Delta\alpha$, as compared to the non-offset arrangement having an intake valve axis 32' which passes through center axis 31 of intake valve drive shaft 2. Therefore, this valve train can facilitate the size reduction of the combustion chamber, and hence improve the fuel efficiency of the engine. An inter-shaft distance $\Delta D$ between intake valve drive shaft 2 and exhaust valve drive shaft 15 must be greater than or equal to a limit determined by intake sprocket 1 and exhaust sprocket 16. Notwithstanding such a limitation on the inter-shaft distance $\Delta D$, the valve train according to this embodiment can decrease the valve included angle $\alpha$ sufficiently.

With the offset arrangement in which cam nose 13*a* of rocker cam 13 rotates to the head inner side during the valve closing operation, and center axis 31 of intake valve drive shaft 2 is offset to the head outer side with respect to intake valve axis 32, the contact zone (a range of travel) Z of contact interface between rocker cam 13 and the upper surface of valve lifter 14 extends to the head inner side of an imaginary auxiliary line L1 extending in parallel to valve axis 32 and passing through center axis 31 of intake valve drive shaft 2, as shown in FIG. 2. The contact zone Z extends largely to the left side as viewed in FIG. 2 to which cam nose 13*a* projects at the time of intake valve closing operation. Thus, this arrangement can expand the contact zone Z by the amount of offset of center axis 31 with respect to valve axis 32, as compared to the non-offset arrangement in which valve axis 32' passes through center axis 31.

In the non-offset arrangement in which valve axis 32' is not offset from center axis 31, the contact zone is limited so that the maximum contact zone is equal to or lower than the radius of valve lifter 14. In the offset arrangement of this embodiment in which cam nose 13*a* of rocker cam 13 rotates to the head inner side during the valve closing period, and center axis 31 of intake valve drive shaft 2 is offset to the head outer side with respect to intake valve axis 32, by contrast, it is possible to set the length of the contact zone greater than the radius of valve lifter 14. The arrangement of this embodiment can expand the maximum contact zone, and thereby improve the output by increasing the maximum valve lift (operating angle) without increasing the size of the valve train and deteriorating the ease of assembly.

Figure 3:
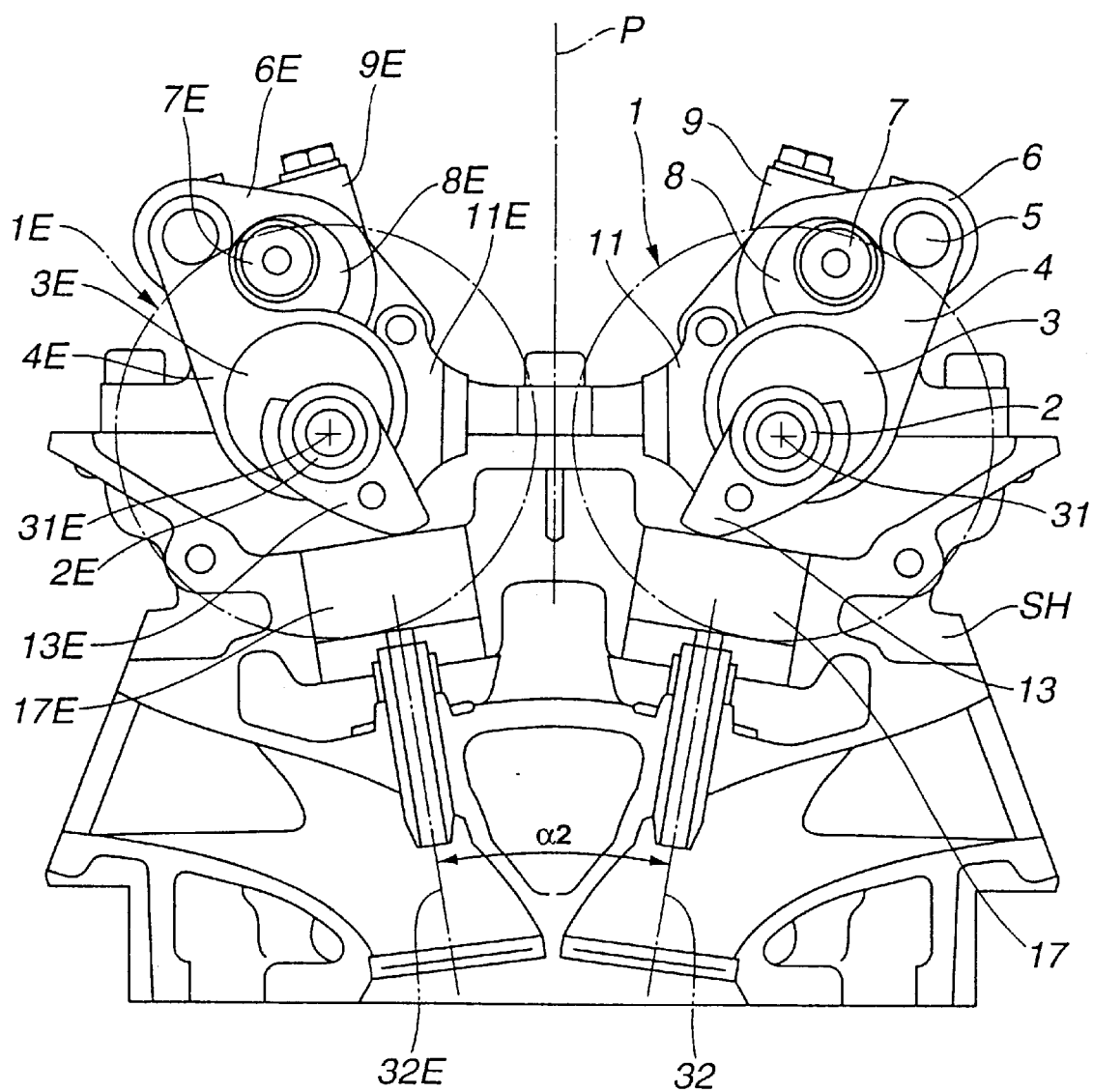
FIG. 3 is a front view showing a valve drive apparatus according to a second embodiment of the present invention.

FIG. 3 shows a valve drive apparatus or mechanism according to a second embodiment of the present invention. In the second embodiment, the drive mechanism for exhaust valve as well as the drive mechanism for the intake valve is constructed in the same manner as the intake valve drive mechanism shown in FIGS. 1 and 2. Therefore, the entire mechanism is approximately symmetrical in the manner of bilateral symmetry with respect to an imaginary median plane (or cylinder center plane) P, as shown in FIG. 3. Each component of the intake valve's side denoted by a reference numeral in FIG. 3 has a corresponding component like a mirror image, as denoted by the addition of suffix E.

A rocker cam 13E for each cylinder is swingably mounted on an exhaust valve drive shaft 2E. Each rocker cam 13E is connected mechanically with exhaust valve drive shaft 2E by a link mechanism serving as operating angle altering mechanism. The cam nose of rocker cam 13E projects to the head inner side during exhaust valve closing operation. A center axis 31E of exhaust valve drive shaft 2E is offset to the head outer side, from the valve axis 32E of the exhaust valve (to the left as viewed in FIG. 3, away from intake valve drive shaft 2). Therefore, exhaust valve axis 32E is offset to the head inner side (to the right in FIG. 3, toward the intake valve drive shaft 2) with respect to center axis 31E.

The arrangement according to the second embodiment can further decrease the valve included angle $\alpha 2$ as compared with the first embodiment, and thereby achieve further size reduction of the combustion chamber and the improvement of fuel economy.

FIG. 4 shows a valve drive apparatus (or mechanism) according to a third embodiment of the present invention. In the third embodiment, a phase altering mechanism 20 is interposed between intake valve drive shaft 2 (and/or exhaust valve drive shaft 2E) and intake sprocket 1 (and/or exhaust sprocket 1E) in the first and second embodiments.

This phase altering mechanism 20 shown in FIG. 4 is arranged to rotate intake valve drive shaft 2 relative to intake sprocket 1, and thereby to vary the rotation phase of the center of intake valve operating angle continuously with respect to the rotation phase of the crank shaft. As the phase altering mechanism 20, it is possible to employ one of known devices such as a mechanism using a helical gear engaging with both of intake sprocket 1 and intake valve drive shaft 2, or a mechanism using a vane.

The system of FIG. 4 includes an oil pressure control valve 21 for changing over a supply oil pressure to phase altering mechanism 20, actuator 23 for rotating control shaft 7, a drive shaft sensor 24 for sensing the rotation phase of intake valve drive shaft 2, a control shaft sensor 25 for sensing the rotation phase of control shaft 7, and an ECU (engine control unit) 22 for controlling actuator 23 and oil pressure control valve 21 by producing control signals in accordance with engine operating conditions, such as crank angle, engine speed, engine load, coolant temperature, sensed by sensors.

The thus-constructed phase altering mechanism 20 capable of continuously varying and holding the center phase of intake valve operating angle is advantageous in that the degree of freedom in control is increased. This phase altering mechanism 20 is disposed at one end of intake valve drive shaft 2, so that the application is easy to various engines, without the need for changes in layout in cylinder head SH.

In general, phase altering mechanism 20 between sprocket 1 and valve drive shaft 2 is difficult to apply to an engine having a small valve included angle. A decrease in diameter of sprocket 1 causes a decrease in a pressure receiving area in the case of hydraulic type and hence incurs a decrease in response speed. On the other hand, an increase in the axial dimension of phase altering mechanism 20 in the front and rear direction of the engine or in the axial direction of drive shaft 2 makes it difficult to mount the mechanism 20.

However, in the offset arrangement of this embodiment in which the valve included angle can be decreased without decreasing the size of sprocket 1, the phase altering mechanism 20 of this kind can be readily applied to an engine having a small valve included angle.

Figure 5:
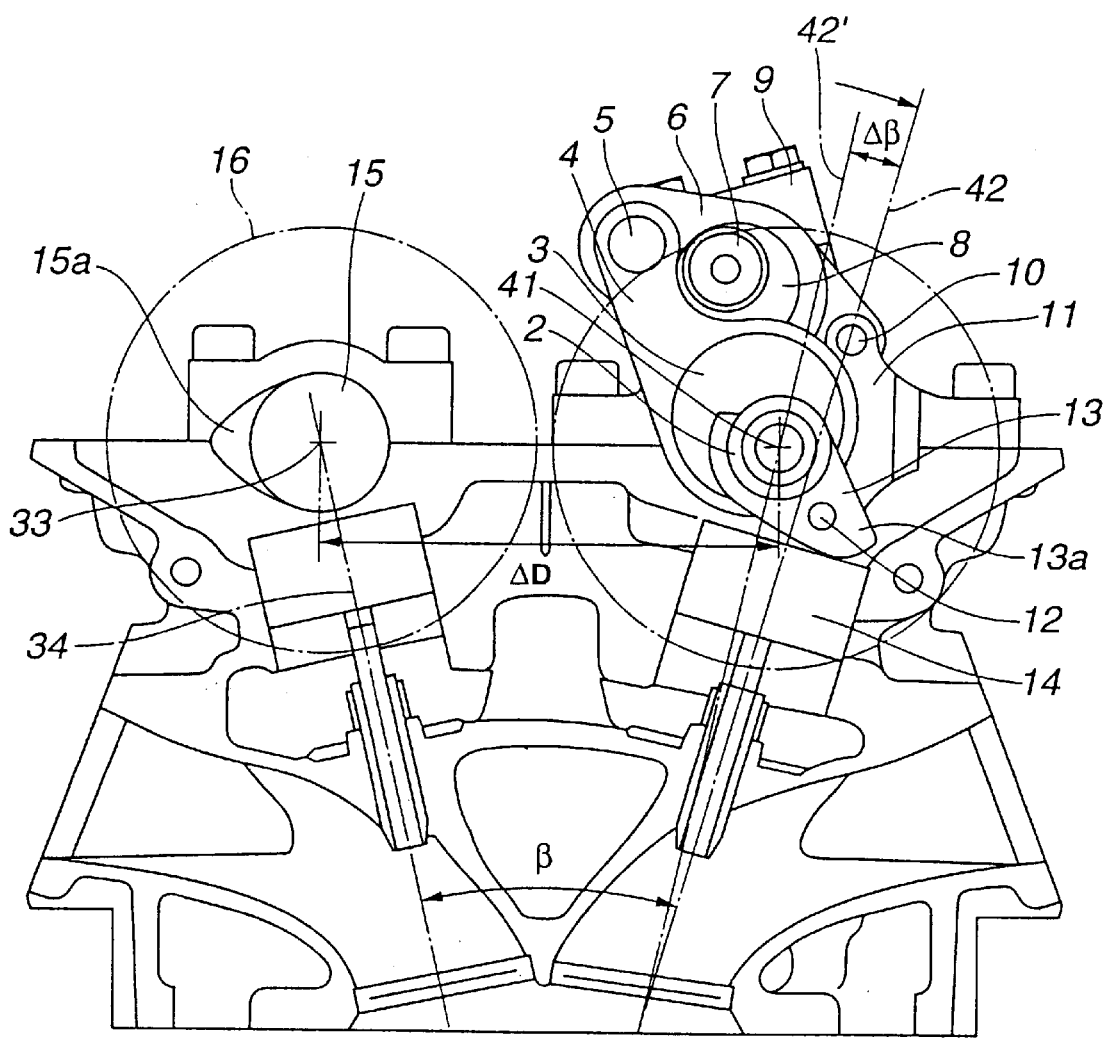
FIG. 5 is a front view showing a valve drive apparatus according to a fourth embodiment.

FIG. 5 shows a valve drive apparatus (or mechanism) according to a fourth embodiment of the present invention. In the preceding embodiments, the valve included angle is decreased mainly in order to improve the fuel efficiency. In the fourth embodiment, the valve included angle is increased to increase the valve diameters of the intake and exhaust valves, and thereby to improve the engine output.

In the valve drive system of FIG. 5, valve nose 13a of rocker cam 13 extends to the head outer side in the closed state of intake valve, in the opposite direction to the cam nose direction in the arrangement shown in FIGS. 1 and 2. Cam nose 13a of rocker cam 13 of FIG. 5 is arranged to rotate toward the head outer side in the counterclockwise direction as viewed in FIG. 5 during the closing operation of the intake valve. The center axis 41 of intake valve drive shaft 2 of FIG. 5 is offset from the valve axis 42 of intake valve toward the head inner side. In other words, valve axis 42 is offset from center axis 41 toward the head outer side.

The layout and rotational direction of the valve train inclusive of intake valve drive shaft 2 and rocker cam 13 shown in FIG. 5 and the layout and rotational direction shown in FIGS. 1 and 2 are substantially symmetrical with respect to valve axis 42.

The offset arrangement of FIG. 5 can increase the valve included angle $\beta$ by $\Delta\beta$ as compared with the non-offset arrangement in which center axis 41 of intake valve drive shaft 2 lies on valve axis 42'. The offset arrangement according to the fourth embodiment makes it possible to increase the valve included angle $\beta$ and thereby to increase the sizes of intake and exhaust valves without increasing the inter-shaft distance $\Delta D$ between intake valve drive shaft 2 and exhaust valve drive shaft 15. As a result, it is possible to improve the engine output without increasing the inter-valve distance $\Delta D$ and hence the cylinder head width.

Figure 6:
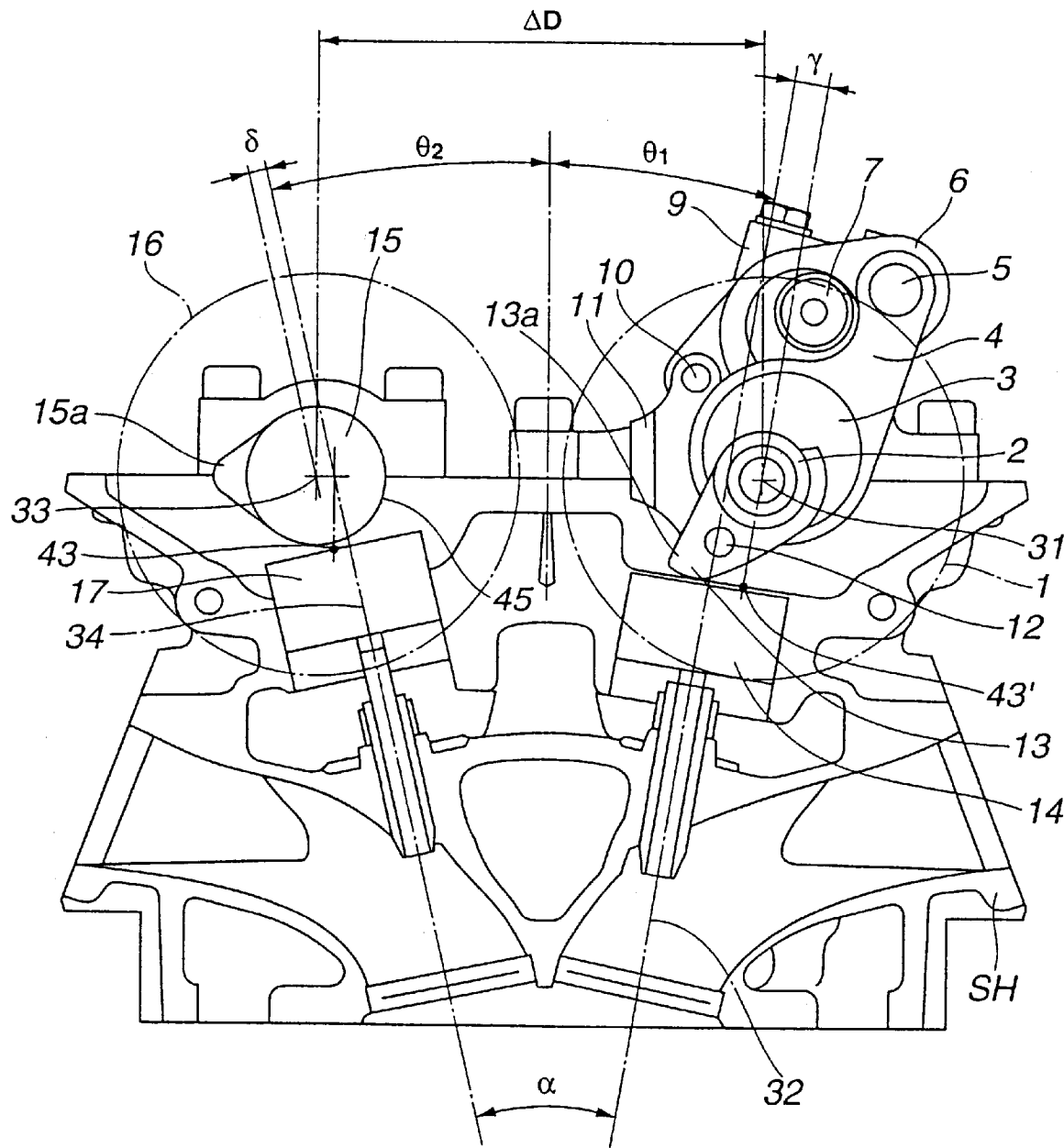
FIG. 6 is a front view showing a valve drive apparatus according to a fifth embodiment.

FIG. 6 shows a valve drive apparatus according to a fifth embodiment of the present invention. The basic arrangement of FIG. 5 is approximately identical to that of FIG. 1. As in the first embodiment of FIG. 1, rocker cam nose 13a of FIG. 6 projects to the head inner side in the intake valve closed state, and the center axis 31 of intake valve drive shaft (drive shaft for rocker arm) 2 is offset from the intake valve axis 32 to the head outer side. Fixed cam (rotation cam) 15a fixedly mounted on exhaust valve drive shaft 15 is profiled to abut on and push down exhaust valve lifter 17.

Unlike the first embodiment, the center axis 33 of exhaust valve drive shaft 15 in the fifth embodiment is offset from exhaust valve axis 34 to the head outer side (to the left side as viewed in FIG. 6). This arrangement can further reduce the valve included angle a without decreasing the inter-shaft distance $\Delta D$ between the intake and exhaust valve drive shafts, to the advantage of further size reduction of the combustion chamber and further improvement in the fuel efficiency.

Figure 7A:
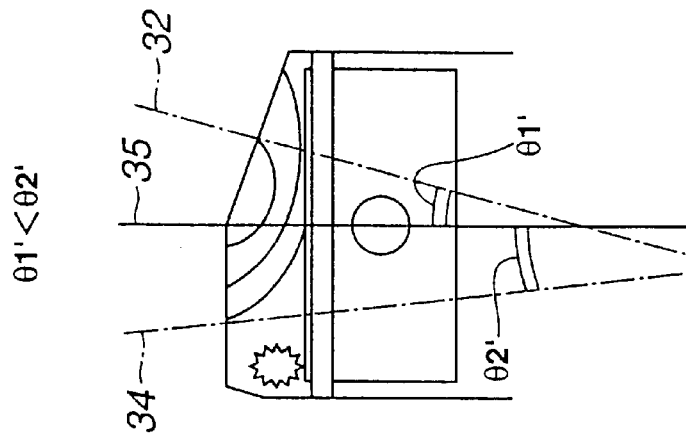
FIGS. 7A, 7B and 7C are views for illustrating operations of the valve drive apparatus of FIG. 6.
Figure 7B:
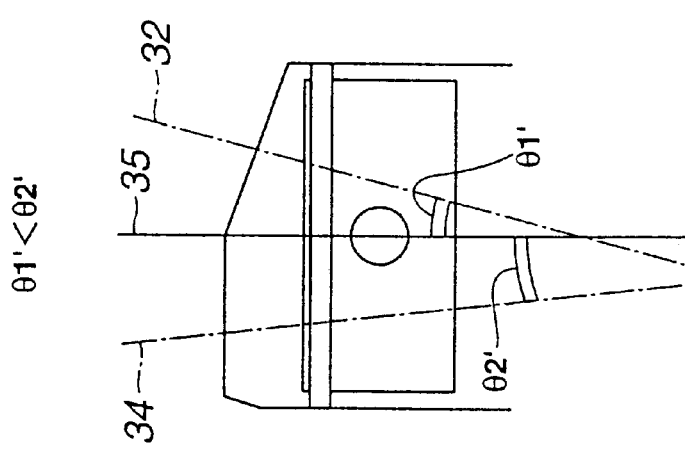
Figure 7C:
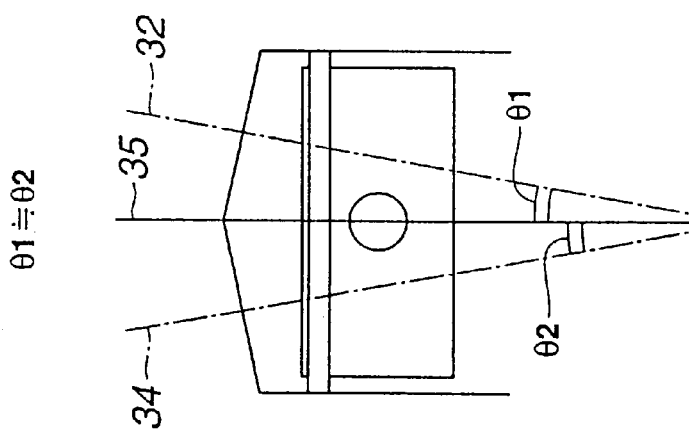

In the example shown in FIG. 6 and FIG. 7A, an angle θ1 formed between intake valve axis 32 and a cylinder center axis (or imaginary cylinder median or center plane) 35 is approximately equal to an angle θ2 formed between exhaust valve axis 34 and cylinder center axis 35. This bisecting arrangement ensures the volumetric efficiency in the fully open state with a sufficient opening area of intake valve, and achieve anti-knocking capability simultaneously. In a comparative example shown in FIGS. 7B and 7C, by contrast, an angle θ1' of intake valve axis 32 from the cylinder center line (or median plane) 35 is made significantly smaller than an angle θ2' of exhaust valve axis 34 from cylinder center line 35, to make the best use of the characteristic of rocker cam for the intake valve. In this asymmetric arrangement, the second angle θ2' between exhaust valve axis 34 and cylinder center axis 35 needs to be large enough to ensure the sufficient valve opening area. In this case, the combustion chamber volume on the exhaust side becomes smaller as compared to the combustion chamber volume on the intake side, and the decrease of the combustion chamber volume on the exhaust side exposed to high temperatures increases the tendency to knock due to end gases on the intake side.

Reverting to FIG. 6, on the exhaust valve's side provided with fixed cam 15a, the contact zone between fixed cam 15a and valve lifter 17 extends on both sides of a reference contact position 43 which is a position at which fixed cam 15a in a base circle section touches valve lifter 17, that is a position at which the upper surface of valve lifter 17 is intersected by an auxiliary line extending in parallel to valve axis 34, through center axis 33 of drive shaft. Therefore, as the distance (offset quantity) between exhaust valve axis 34 and center axis 33 of exhaust valve drive shaft 15 is decreased, it becomes easier to increase the length of the contact zone (contact travel distance) of the contact between fixed cam 15a and valve lifter 17. On the intake valve's side provided with rocker cam 13 swinging within a rotational range, the contact zone between rocker cam 13 and valve lifter 14 extends only on one side of a reference contact point 43' which is a position at which rocker cam 13 in a base circle section touches valve lifter 14. Therefore, as the distance (offset quantity) between intake valve axis 32 and center axis 31 of intake valve drive shaft 2 is increased, it becomes easier to increase the length of the contact zone of the contact between rocker cam 13 and valve lifter 14.

In the fifth embodiment of FIG. 6, therefore, the distance (offset quantity) γ between intake valve axis 32 and intake valve drive shaft axis 31 is set greater than the distance (offset quantity) δ between exhaust valve axis 34 and exhaust valve drive shaft axis 33. This arrangement is effective in increasing the lengths of the actual contact zones on both of the intake valve's side and the exhaust valve's side. By sufficiently increasing the time area on the exhaust valve's side having fixed cam, the fifth embodiment can effectively prevent the fuel efficiency from being deteriorated by an increase in pumping loss due to a delay in gas replacement of burnt gases, and prevent the volumetric efficiency from being decreased by an increase in the residual quantity of burned gases at high loads.

By setting the before-mentioned reference contact position 43' near the outer periphery of valve lifter 14, without changing the distance ΔD between the intake and exhaust valve drive shafts 2 and 15, it is possible to further increase the offset quantity y on the intake valve's side, and to further decrease the offset quantity δ on the exhaust valve's side, and to further increase the margin of the contact travel zone on both of the intake and exhaust valve's sides.

Figure 8:
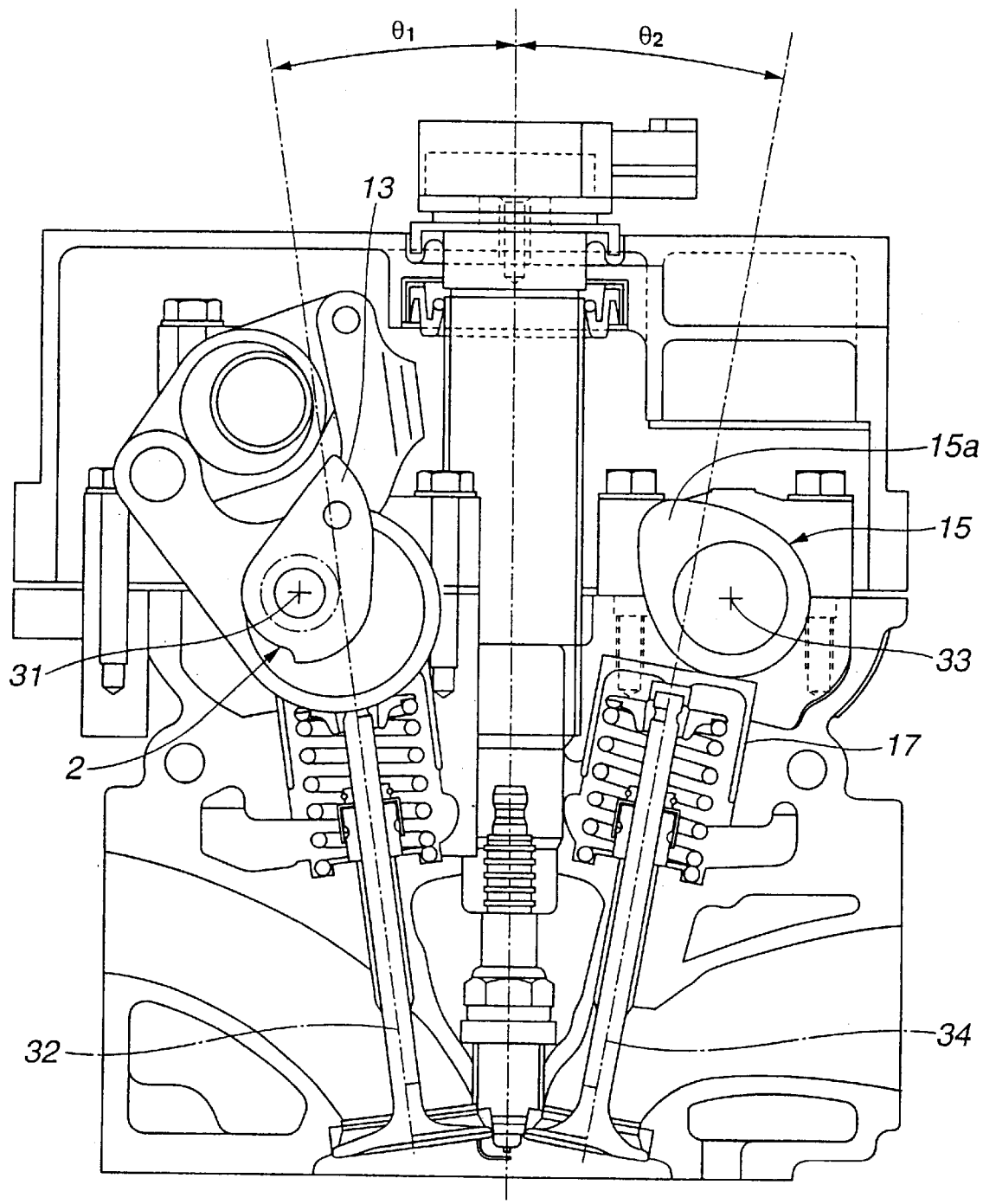
FIG. 8 is a view showing a valve drive apparatus according to a sixth embodiment.
Figure 9A:
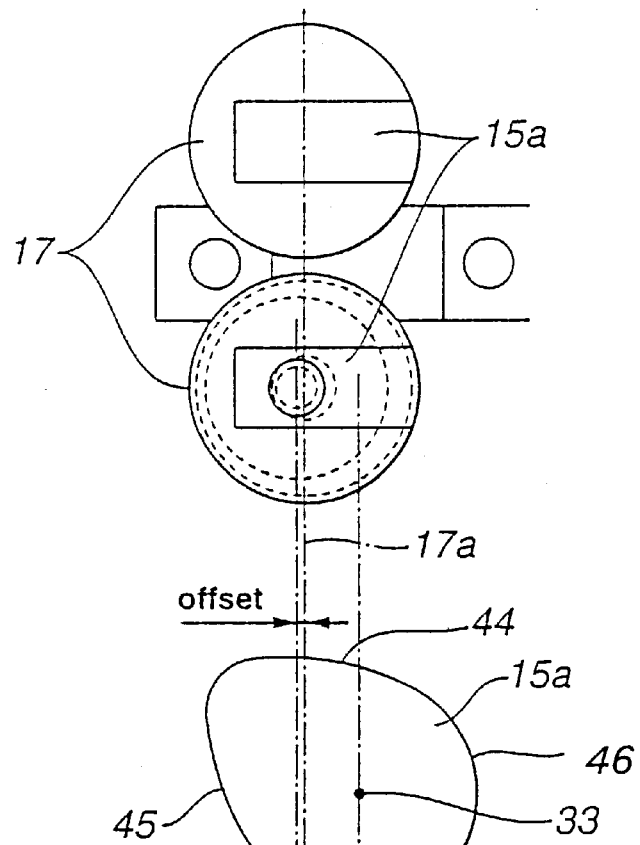
FIGS. 9A and 9B are schematic views illustrating an exhaust valve and a fixed cam according to the sixth embodiment.
Figure 9B:
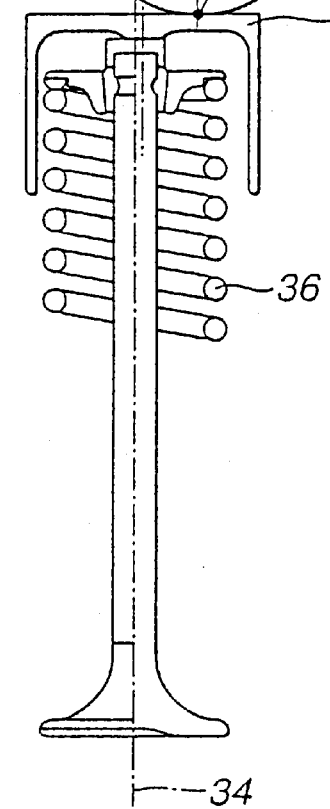
Figure 10:
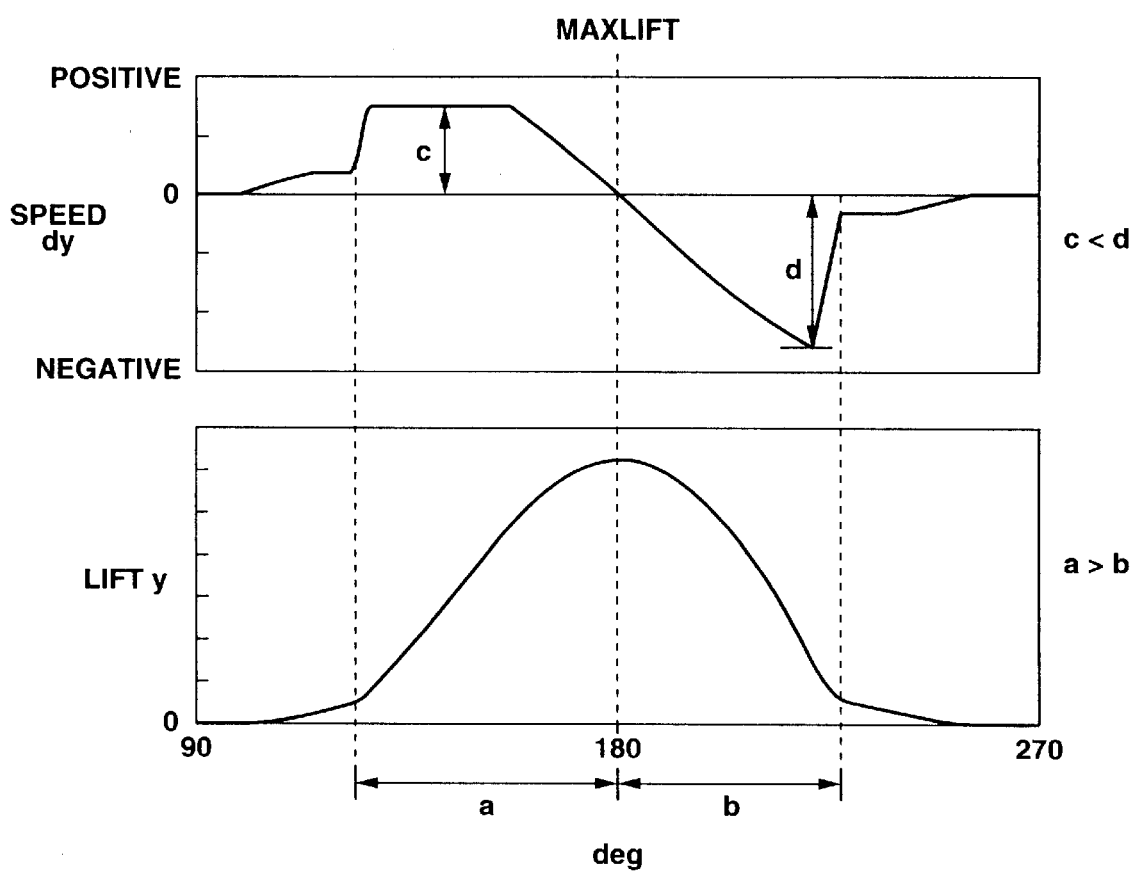
FIG. 10 is a graph showing characteristics of the exhaust side fixed cam in the exhaust valve train according to the sixth embodiment.

FIGS. 8~10 show a valve drive apparatus or mechanism according to a sixth embodiment of the present invention.

The basic arrangement of the sixth embodiment is approximately identical to that of the fifth embodiment shown in FIG. 6. That is, center axis 31 of intake valve drive shaft 2 provided with rocker cam 13 is offset from intake valve axis 32 to the head outer side. Center axis 33 of exhaust valve drive shaft 15 provided with fixed cam 15a is offset from exhaust valve axis 34 to the head outer side.

Moreover, in the sixth embodiment, as shown in FIG. 9, a center axis 17a of exhaust side valve lifter 17 is offset from exhaust valve axis 34 to the head outer side (to the right in FIGS. 8 and 9) within the limit to prevent interference with the outer circumference of a valve spring 36 received in valve lifter 17. Thus, lifter center axis 17a and center axis 33 of exhaust valve drive shaft 15 are offset from exhaust valve axis 34 to the same side. By the offset of lifter center axis 17a to the same side, the offset quantity of center axis 33 of exhaust valve drive shaft 15 with respect to the lifter center axis 17a is decreased. The decrease of the separation of center axis 33 of exhaust valve drive shaft 15 provided with fixed cam 15a from center axis 17a of valve lifter 17 is effective for the expansion of the contact zone between fixed cam 15a and valve lifter 17.

Fixed cam 15a rotates in the clockwise direction in FIG. 9B. Accordingly, with respect to a reference contact point 43 at which a base circle section 46 of fixed cam 15a touches valve lifter 17, a cam ascending section 44 touches valve lifter 17 on the side (the right side as viewed in FIGS. 9A and 9B) on which a maximum contact travel distance is short, and a cam descending section 45 touches valve lifter 17 on the side (the left side in FIGS. 9A and 9B) on which the maximum contact travel distance is long. In this embodiment, the center axis 17a of exhaust valve lifter 17 is offset to the (right) side on which the maximum contact travel distance (or contact range) is shorter, so that the relatively short contact travel distance of the cam ascending section 44 can be increased effectively. Therefore, this arrangement can increase the maximum lift speed (or rate of change of lift) in the cam ascending section 44, and increase the opening area per unit time (time area) of the exhaust valve.

FIG. 10 shows the valve lift (quantity) (in a lower graph) and the speed (rate of change) of the valve lift (in an upper graph) with respect to the rotation angle of exhaust valve drive shaft 15 and fixed cam 15a. In this example, the cam angle is set equal to 180° at the maximum valve lift.

In the direct drive type valve train having fixed cam, in general, each of the maximum lift speeds c and d in the cam ascending section 44 and descending section 45 is substantially proportional to the contact travel distance from the reference contact position 43. Accordingly, in the offset arrangement in which the valve lifter center line 17a is offset from center axis 33 of exhaust valve drive shaft 15 as in the sixth embodiment and the fifth embodiment, if the profile of fixed cam 15a is set symmetrical as in the ordinary design, the actual contact travel distance on the side on which the maximum contact distance is longer is limited to a level comparable to the level of the maximum contact distance on the side on which the maximum contact distance is shorter, so that it is difficult to increase the opening area per unit time (time area) of the valve.

Therefore, in the sixth embodiment, the profile of fixed cam 15a is asymmetric. In this example, the cam ascending section 44 (contacting with the valve lifter on the side on which the contact travel distance from reference contact point 43 is shorter) is designed to decrease the maximum lift speed c relatively, and to increase the valve opening cam angle a relatively. On the other hand, the cam descending section 45 (contacting with the valve lifter on the side on which the contact travel distance from reference contact point 43 is longer)is designed to increase the lift speed d relatively, and decrease the valve opening cam angle b relatively. With this asymmetric design, the valve train according to this embodiment can increase the opening area per unit time (time area) of the exhaust valve.

Thus, in the sixth embodiment, there is formed an offset between exhaust valve axis 34 and exhaust valve drive shaft axis 33 on the exhaust valve's side on which the temperature of the operating fluid is high as compared to the intake valve's side, and the influence on the time area during the valve operation is relatively weak, and the cam ascending section 44 to increase the valve lift is profiled to decrease the maximum lift speed (c<d), and to increase the operating angle relatively (a>b). With this arrangement, the sixth embodiment can limit or decrease the contact travel distance of the contact with the valve lifter while maintaining a desired time area of the exhaust valve. The cam descending section 45 to decrease the valve lift is profiled to increase the maximum lift speed, and to decrease the operating angle relatively to increase the time area of the exhaust valve by utilizing the longer contact distance. In this way, this embodiment can increase the opening area per unit time (time area) of the exhaust valve sufficiently even though the contact travel distance of the cam ascending section 44 for increasing the valve lift is short.

In this embodiment, it is possible to achieve the offset of valve lifter 17 and the asymmetry of fixed cam 15a both simultaneously without the need for a trade-off therebetween.

Figure 11:
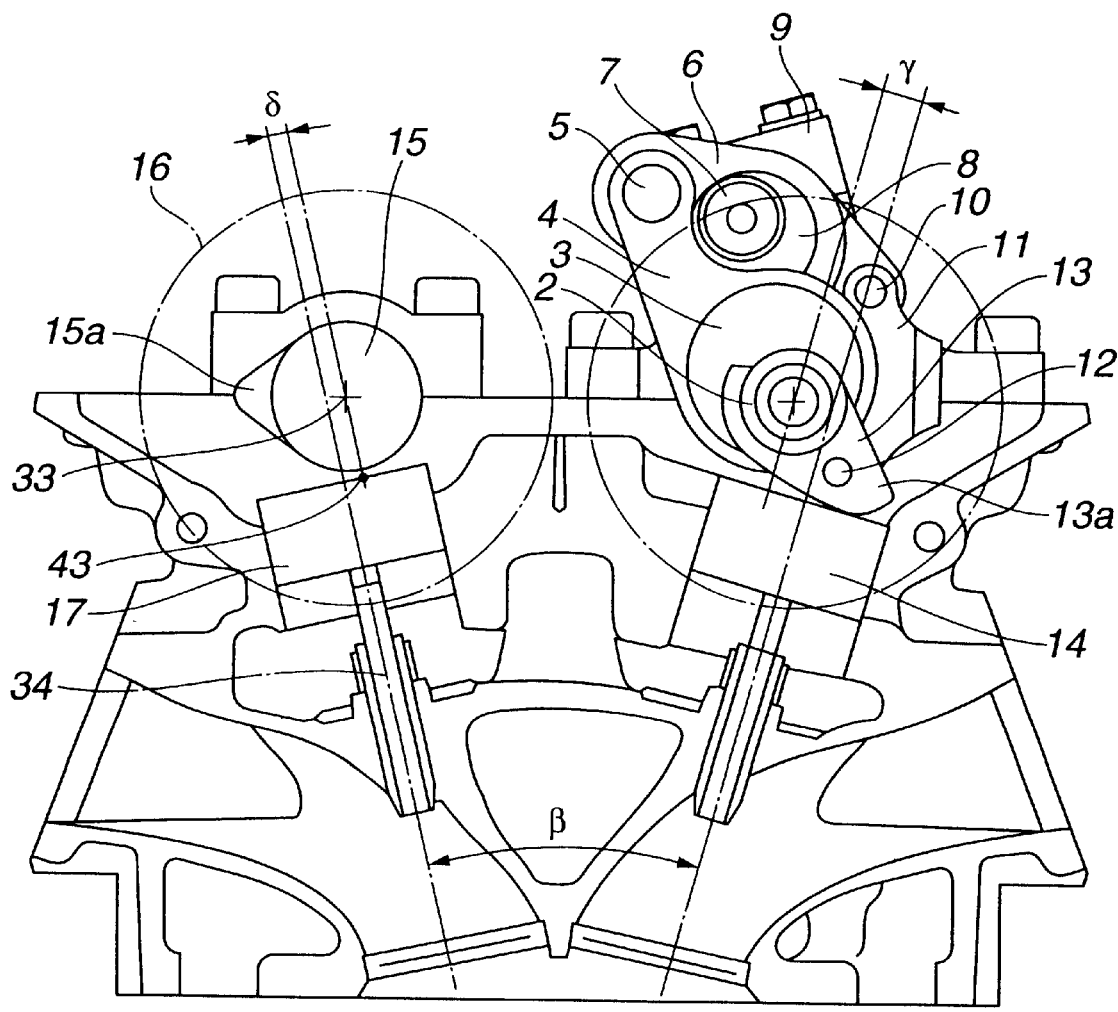
FIG. 11 is a front view showing a valve drive apparatus according to a seventh embodiment.

FIG. 11 shows a main portion of a valve drive apparatus or mechanism according to a seventh embodiment of the present invention. The basic arrangement of this embodiment is approximately identical to that of the fourth embodiment of FIG. 5. Rocker cam 13 is so designed that its cam nose 13a projects to the head outer side (to the right in FIG. 11) in the intake valve closed state. In the seventh embodiment of FIG. 11, center axis 33 of exhaust valve drive shaft 15 provided with fixed cam 15a is offset with respect to exhaust valve axis 34, to the head inner side. In addition to the effects of the fourth embodiment, this offset arrangement of FIG. 11 can increase the valve included angle β without increasing the distance between the intake and exhaust valve drive shafts 2 and 15, and thereby improve the volumetric efficiency to improve the output without increasing the width and size of cylinder head SH.

Preferably, the center axis of valve lifter 17 for the exhaust valve is offset with respect to valve axis 34 of the exhaust valve, to the same direction as the offset direction of the valve axis 34 of exhaust valve 15 as in the sixth embodiment of FIGS. 8~10 (to the head inner side in the rightward direction in FIG. 11). More desirably, the profile of fixed cam 15a on exhaust valve drive shaft 15 is made asymmetric as in the sixth embodiment. Conversely to the example of FIG. 10, the cam descending section (the region for decreasing the exhaust valve lift) for contacting with valve lifter 17 on the side (the right side in FIG. 11) on which the contact travel distance is relatively short is designed to decrease the maximum lift speed relatively, and to increase the operating angle relatively. The cam ascending section (the region for increasing the lift) for contacting with valve lifter 17 on the side (the left side in FIG. 11) on which the contact travel distance is relatively long is designed to increase the maximum lift speed relatively, and to decrease the operating angle relatively.

According to the illustrated embodiments of the present invention, a first shaft axis of a first valve drive shaft (2 or 15) is located on one side of the valve axis of a first valve, and a cam nose of a rocker cam projects to the other side of the valve axis in the closed state of the first valve. This arrangement makes it possible to increase the contact travel distance between the rocker cam and valve lifter to a value greater than the radius of the valve lifter.

Although the invention has been described above by reference to certain embodiments of the invention, the invention is not limited to the embodiments described above. Modifications and variations of the embodiments described above will occur to those skilled in the art in light of the above teachings. In the fourth embodiment of FIG. 5, it is possible to apply the design of the intake side to the exhaust side, to further increase the valve included angle. Moreover, it is optional to employ the phase altering mechanism 20 as in the third embodiment of FIG. 4. The scope of the invention is defined with reference to the following claims.

What is claimed is:

1. A valve drive apparatus for an internal combustion engine, the valve drive apparatus comprising:
   a first valve drive shaft adapted to be driven by the engine;
   a rocker cam to push a first valve of the engine by swinging about a first shaft axis of the first valve drive shaft; and
   a link mechanism connecting mechanically the rocker arm and the first valve drive shaft to transmit motion from the first valve drive shaft to the rocker cam, the first shaft axis of the first valve drive shaft about which the rocker cam swings being offset from a valve axis of the first valve,
   wherein the first shaft axis of the first valve drive shaft is located on a first side of the valve axis of the first valve, and the rocker cam comprises a cam nose projecting to a second side of the valve axis in a closed state of the first valve.

2. The valve drive apparatus as claimed in claim 1, wherein the first valve drive shaft is provided with a first wheel member to receive the engine rotation, the valve drive apparatus further comprises a second valve drive shaft provided with a second wheel member to receive the engine rotation and to operate a second valve of the engine, one of the first and second valves being an intake valve, the other of the first and second valves being an exhaust valve, the first and second valve drive shafts extend in parallel to each other in a direction of row of cylinders of the engine above a cylinder head of the engine, and each of the first and second wheel members is a rotating component of a timing mechanism to relate a valve drive shaft speed to a crankshaft speed of the engine; and wherein the rocker cam comprises a cam nose projecting to a second side of the valve axis of the first valve in a closed state of the first valve.

3. The valve drive apparatus as claimed in claim 2, wherein the valve drive apparatus further comprises a first valve lifter for the first valve, and the rocker cam comprises a base circle section to touch the first valve lifter at a contact position near an outer periphery of the valve lifter.

4. The valve drive apparatus as claimed in claim 2, wherein the first shaft axis of the first valve drive shaft is located on an outer side of the valve axis of the first valve, and the cam nose of the rocker cam in the closed state of the first valve projects to an inner side of the valve axis of the first valve toward an imaginary center plane extending between the first and second valves.

5. The valve drive apparatus as claimed in claim 2, wherein the first shaft axis of the first valve drive shaft is located on an inner side of the valve axis of the first valve, and the cam nose of the rocker cam in the closed state of the first valve projects to an outer side of the valve axis away from an imaginary center plane extending between the first and second valves.

6. The valve drive apparatus as claimed in claim 2, wherein the first valve is an intake valve of the engine, so that the first valve drive shaft is an intake valve drive shaft; the valve drive apparatus further comprises an exhaust valve drive shaft, and a fixed cam rotating as a unit with the exhaust valve drive shaft, to push an exhaust valve of the engine by abutting on an exhaust valve lifter; and an axis of the exhaust valve drive shaft is offset from an axis of the exhaust valve.

7. The valve drive apparatus as claimed in claim 6, wherein the fixed cam comprises a first cam section profiled to define a first maximum rate of change of a lift and a second cam section profiled to define a second maximum rate of change of the lift, one of the first and second cam sections is a cam ascending section, the other of the first and second cam sections is a cam descending section, the first maximum rate of change of the lift being smaller than the second maximum rate of change of the lift; and wherein the first cam section is arranged to touch the exhaust valve lifter on a first side having a shorter contact distance on the valve lifter, and the second cam section is arranged to touch the exhaust valve lifter on a second side having a longer contact distance on the exhaust valve lifter.

8. The valve drive apparatus as claimed in claim 6, wherein the fixed cam comprises a first cam section profiled to define a first valve opening cam angle and a second cam section profiled to define a second valve opening cam angle, one of the first and second cam sections is a cam ascending section, the other of the first and second cam sections is a cam descending section, the first valve opening cam angle being greater than the second valve opening cam angle; and wherein the first cam section is arranged to touch the exhaust valve lifter on a first side having a shorter contact distance on the exhaust valve lifter, and the second cam section is arranged to touch the exhaust valve lifter on a second side having a longer contact distance on the exhaust valve lifter.

9. The valve drive apparatus as claimed in claim 2, wherein the valve drive apparatus further comprises a phase adjusting device to vary a phase of rotation inputted to the first valve drive shaft.

10. The valve drive apparatus as claimed in claim 2, wherein the link mechanism comprises an actuator to continuously vary an operating angle of the first valve.

11. The valve drive apparatus as claimed in claim 2, wherein the link mechanism comprises:
    an eccentric cam fixedly mounted on the first valve drive shaft,
    a first link fit over the eccentric cam,
    a rocker arm comprises a center portion swingably mounted on a control cam mounted on a control shaft extending along the first valve drive shaft, a first arm end connected with the first link, and a second arm end,
    a second link comprising a first link end connected with the second arm end of the rocker arm, and a second link end connected with the rocker cam.

12. The valve drive apparatus as claimed in claim 2, wherein the valve drive apparatus further comprises a valve lifter for the first valve, and the cam nose of the rocker cam projects toward a portion of the valve lifter on the second side of the valve axis the first valve when the first valve is in the closed state.

13. The valve drive apparatus as claimed in claim 2, wherein the link mechanism is arranged to close the first valve by swinging the cam nose of the rocker cam from the first side of the valve axis to the second side of the valve axis during a valve closing period of the first valve.

14. A valve drive apparatus for an internal combustion engine, the valve drive apparatus comprising:
    a first valve drive shaft adapted to be driven by the engine;
    a rocker cam to push a first valve of the engine by swinging about a first shaft axis of the first valve drive shaft; and
    a link mechanism connecting mechanically the rocker arm and the first valve drive shaft to transmit motion from the first valve drive shaft to the rocker cam, the first shaft axis of the first valve drive shaft about which the rocker cam swings being offset from a valve axis of the first valve,
    wherein the first valve is an intake valve of the engine, so that the first valve drive shaft is an intake valve drive shaft; the valve drive apparatus further comprises an exhaust valve drive shaft, and a fixed cam rotating as a unit with the exhaust valve drive shaft, to push an exhaust valve of the engine by abutting on an exhaust valve lifter; and an axis of the exhaust valve drive shaft is offset from an axis of the exhaust valve, and
    wherein a first angle between the axis of the intake valve and an imaginary center plane of a cylinder head of the engine is substantially equal to a second angle between the axis of the exhaust valve and the center plane of the cylinder head.

15. A valve drive apparatus for an internal combustion engine, the valve drive apparatus comprising:
    a first valve drive shaft adapted to be driven by the engine;
    a rocker cam to push a first valve of the engine by swinging about a first shaft axis of the first valve drive shaft; and
    a link mechanism connecting mechanically the rocker arm and the first valve drive shaft to transmit motion from the first valve drive shaft to the rocker cam, the first shaft axis of the first valve drive shaft about which the rocker cam swings being offset from a valve axis of the first valve,
    wherein the first valve is an intake valve of the engine, so that the first valve drive shaft is an intake valve drive shaft; the valve drive apparatus further comprises an exhaust valve drive shaft, and a fixed cam rotating as a unit with the exhaust valve drive shaft, to push an exhaust valve of the engine by abutting on an exhaust valve lifter; and an axis of the exhaust valve drive shaft is offset from an axis of the exhaust valve, and
    wherein a distance between the axis of the intake valve and the axis of the intake valve drive shaft is greater than a distance between the axis of the exhaust valve and the axis of the exhaust valve drive shaft.

16. A valve drive apparatus for an internal combustion engine, the valve drive apparatus comprising:
    a first valve drive shaft adapted to be driven by the engine;
    a rocker cam to push a first valve of the engine by swinging about a first shaft axis of the first valve drive shaft; and
    a link mechanism connecting mechanically the rocker arm and the first valve drive shaft to transmit motion from the first valve drive shaft to the rocker cam, the first shaft axis of the first valve drive shaft about which the rocker cam swings being offset from a valve axis of the first valve, wherein the first valve is an intake valve of the engine, so that the first valve drive shaft is an intake valve drive shaft; the valve drive apparatus further comprises an exhaust valve drive shaft, and a fixed cam rotating as a unit with the exhaust valve drive shaft, to push an exhaust valve of the engine by abutting on an exhaust valve lifter; and an axis of the exhaust valve drive shaft is offset from an axis of the exhaust valve, and wherein a center line of the exhaust valve lifter contacting with the fixed cam is offset from the axis of the exhaust valve so that the center line of the exhaust valve lifter and the axis of the exhaust valve drive shaft are offset to the same side of the axis of the exhaust valve.

17. A valve drive apparatus for an internal combustion engine, the valve drive apparatus comprising:

a first valve drive shaft adapted to be driven by the engine;

a rocker cam to push a first valve of the engine by swinging about a first shaft axis of the first valve drive shaft; and a link mechanism connecting mechanically the rocker arm and the first valve drive shaft to transmit motion from the first valve drive shaft to the rocker cam, the first shaft axis of the first valve drive shaft about which the rocker cam swings being offset from a valve axis of the first valve, wherein the first valve is an intake valve of the engine, so that the first valve drive shaft is an intake valve drive shaft; the valve drive apparatus further comprises an exhaust valve drive shaft, and a fixed cam rotating as a unit with the exhaust valve drive shaft, to push an exhaust valve of the engine by abutting on an exhaust valve lifter; and an axis of the exhaust valve drive shaft is offset from an axis of the exhaust valve, and wherein the rocker cam for the intake valve comprises a cam nose which, in the closed state of the intake valve, projects to an inner side of a cylinder head toward the exhaust valve, and the axis of the exhaust valve drive shaft is offset from the axis of the exhaust valve, to an outer side of the axis of the exhaust valve away from the axis of the intake valve.

18. A valve drive apparatus for an internal combustion engine, the valve drive apparatus comprising:

a first valve drive shaft adapted to be driven by the engine;

a rocker cam to push a first valve of the engine by swinging about a first shaft axis of the first valve drive shaft; and a link mechanism connecting mechanically the rocker arm and the first valve drive shaft to transmit motion from the first valve drive shaft to the rocker cam, the first shaft axis of the first valve drive shaft about which the rocker cam swings being offset from a valve axis of the first valve, wherein the first valve is an intake valve of the engine, so that the first valve drive shaft is an intake valve drive shaft; the valve drive apparatus further comprises an exhaust valve drive shaft, and a fixed cam rotating as a unit with the exhaust valve drive shaft, to push an exhaust valve of the engine by abutting on an exhaust valve lifter; and an axis of the exhaust valve drive shaft is offset from an axis of the exhaust valve, and wherein the rocker cam for the intake valve comprises a cam nose which, in the closed state of the intake valve, projects to an outer side of a cylinder head away from the exhaust valve, and the axis of the exhaust valve drive shaft is offset from the axis of the exhaust valve to an inner side of a cylinder head toward the axis of the intake valve.

19. An internal combustion engine comprising:

an exhaust valve drive shaft provided with a wheel member arranged coaxially with the exhaust valves drive shaft, to receive an engine rotation to drive the exhaust valve drive shaft;

an intake valve drive shaft arranged in parallel to the exhaust valve drive shaft and provided with a wheel member arranged coaxially with the intake valve drive shaft to receive the engine rotation to drive the intake valve drive shaft;

a link mechanism connecting with the intake valve drive shaft to transmit motion from the intake valve drive shaft; and a rocker cam mounted swingably on the intake valve drive shaft, and connected with the intake valve drive shaft through the link mechanism, the rocker cam comprising a cam nose to operate an intake valve of the engine by applying a pushing force along an intake valve axis of the intake valve, the cam nose of the rocker cam projecting to one side of the intake valve axis of the intake valve in a closed state of the intake valve whereas an axis of the intake valve drive shaft about which the rocker cam swings is offset from the intake valve axis of the intake valve to the other side of the valve axis of the intake valve.

20. The internal combustion engine as claimed in claim 19, wherein the link mechanism is arranged to close the intake valve by forcing the cam nose of the rocker cam to slide on a valve lifter of the intake valve, from the side of the intake valve axis to which the axis of the intake valve drive shaft is offset from the intake valve axis, to the side of the intake valve axis to which the cam nose of the rocker cam projects in the closed state of the intake valve.

* * * * *